United States Patent
Alfaro et al.

(10) Patent No.: US 7,971,226 B2
(45) Date of Patent: Jun. 28, 2011

(54) INTERACTIVE GAME SYSTEM WITH COMPUTER-ANIMATED GAME PIECES

(75) Inventors: Toby Alfaro, San Diego, CA (US); David Hewitt, Oceanside, CA (US)

(73) Assignee: The Upper Deck Company, LLC, Cheyenne, NV (US)

( * ) Notice: Subject to any disclaimer, the term of this patent is extended or adjusted under 35 U.S.C. 154(b) by 1592 days.

(21) Appl. No.: 11/097,501

(22) Filed: Apr. 1, 2005

(65) Prior Publication Data

US 2006/0223599 A1    Oct. 5, 2006

(51) Int. Cl.
- *A63A 9/24* (2006.01)
- *A63A 13/00* (2006.01)
- *G06A 17/00* (2006.01)
- *G06A 19/00* (2006.01)

(52) U.S. Cl. ............... 725/133; 725/141; 463/3; 463/7; 463/23; 463/29; 463/40; 463/42; 463/43

(58) Field of Classification Search .................. None
See application file for complete search history.

(56) References Cited

U.S. PATENT DOCUMENTS

| | | | | |
|---|---|---|---|---|
| 5,720,663 | A * | 2/1998 | Nakatani et al. | 463/23 |
| 6,273,822 | B1 * | 8/2001 | Tanaka | 463/43 |
| 6,354,940 | B1 * | 3/2002 | Itou et al. | 463/8 |
| 6,358,148 | B1 * | 3/2002 | Tanaka | 463/23 |
| 6,786,825 | B2 * | 9/2004 | Kawazu | 463/43 |
| 7,001,272 | B2 * | 2/2006 | Yamashita et al. | 463/7 |
| 7,204,758 | B2 * | 4/2007 | Tsuchida et al. | 463/43 |
| 7,281,981 | B2 * | 10/2007 | Yotoriyama | 463/32 |
| 7,367,882 | B2 * | 5/2008 | Fukutome | 463/7 |
| 2002/0082088 | A1 * | 6/2002 | Nagashima | 463/42 |
| 2002/0107060 | A1 * | 8/2002 | Ohnuma et al. | 463/7 |
| 2002/0137564 | A1 * | 9/2002 | Kawazu | 463/43 |
| 2002/0173358 | A1 * | 11/2002 | Yoshida | 463/42 |
| 2004/0143852 | A1 * | 7/2004 | Meyers | 725/133 |
| 2004/0198498 | A1 * | 10/2004 | Yamashita et al. | 463/43 |
| 2004/0204212 | A1 * | 10/2004 | Sato | 463/5 |
| 2004/0259636 | A1 * | 12/2004 | Machida | 463/30 |
| 2004/0266505 | A1 * | 12/2004 | Keam et al. | 463/1 |
| 2005/0059483 | A1 * | 3/2005 | Borge | 463/29 |
| 2005/0170887 | A1 * | 8/2005 | Fujii | 463/31 |

* cited by examiner

*Primary Examiner* — Paul A. D'Agostino
(74) *Attorney, Agent, or Firm* — Roeder & Broder LLP

(57) ABSTRACT

An interactive computer game system (10) for one or more players includes a game server (12) that generates a first game piece (19A) controlled by a first player, and a second game piece (19B). The first game piece (19A) has a first adjustable battle parameter that is adjustable by the first player and a first fixed battle parameter that is not adjustable by the first player. The second game piece (19B) can have a second adjustable battle parameter that is adjustable by the second player and a second fixed battle parameter that is not adjustable by the second player. The game pieces (19A, 19B) engage in a battle having an outcome determined by an algorithm that is based at least partly upon one or more of the adjustable battle parameters and/or one or more of the fixed battle parameters. In another embodiment, the game server (12) generates a pool of game pieces from which the players select activated first game pieces and second game pieces, respectively. The game pieces of each player engage in battles until only one player has at least one activated game piece remaining, and is thereby determined the winning player.

33 Claims, 7 Drawing Sheets

| Battles Won | Points |
|---|---|
| 1 | 100 |
| 2 | 110 |
| 3 | 121 |
| 4 | 133 |
| 5 | 146 |
| 6 | 161 |
| 7 | 177 |
| 8 | 194 |
| 9 | 214 |
| 10 | 235 |
| 11 | 259 |
| 12 | 285 |
| 13 | 313 |
| 14 | 345 |
| 15 | 380 |
| 16 | 418 |
| 17 | 460 |
| 18 | 505 |
| 19 | 555 |
| 20 | 612 |
| 21 | 673 |
| 22 | 740 |
| 23 | 814 |

Fig. 4

INTERACTIVE GAME SYSTEM WITH COMPUTER-ANIMATED GAME PIECES

BACKGROUND

The popularity of computer games has steadily increased in recent years. One variety of computer games has emerged that tests a player's knowledge. For example, some games can require a knowledge base involving somewhat trivial, relatively unimportant matters, while others may necessitate an understanding of historical or current events. These types of memory games focus on what a player has learned during his or her lifetime. A person playing one of these knowledge-based games may not have a knack for recalling such inconsequential information, or may simply not be interested in "fast facts".

Unfortunately, games requiring black and white knowledge of specific information may require little or no strategic skills. In particular, no specific plan of attack is necessary to play these kinds of games. Moreover, no tactical decision-making abilities are required. As a result thereof, very often the more well-read person will usually prevail, rather than one who can outfox his or her opponent. Further, knowledge-based computer games can lack any sort of "physical" element. After a short period of time, the lack of strategy, variation and/or a physical element in the game can cause the players' interest to diminish.

SUMMARY

The present invention is directed to an interactive computer game system for one or more players. In one embodiment, the game system includes a game server that generates a first game piece that is remotely controlled by a first player, and a second game piece. The first game piece can have a first adjustable battle parameter that is adjusted by the first player and a first fixed battle parameter that is not adjusted by the first player. The second game piece can have a second fixed battle parameter. The second game piece can be controlled by the game server or by a second player. The game pieces engage in a battle having an outcome determined by an algorithm that is based at least partly upon the first adjustable battle parameter and one or both of the fixed battle parameters. In an alternative embodiment, the second game piece has a second adjustable battle parameter that is adjustable by the second player. In this embodiment, the algorithm is also based at least partly upon the second adjustable battle parameter.

In another embodiment, the game server can randomly generate a pool of game pieces. The first player and the second player can then each alternately select a set of activated first game pieces and second game pieces, respectively, from the pool of game pieces. During a first round, the game server allows each of the first game pieces to separately engage in only one battle with only one of the second game pieces, and allows each of the second game pieces to separately engage in only one battle with only one of the first game pieces. The outcome of each battle during the first round results in one losing game piece that is inactivated, and one winning game piece that remains activated. During each successive round, battles continue until only one player has at least one activated game piece remaining, and is thereby determined to be the winning player.

The present invention is also directed toward a method for playing a computer game.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 4 is an embodiment of a table that determines battle points based on the number of battles won by a virtual game piece.

DESCRIPTION

Figure 1A:
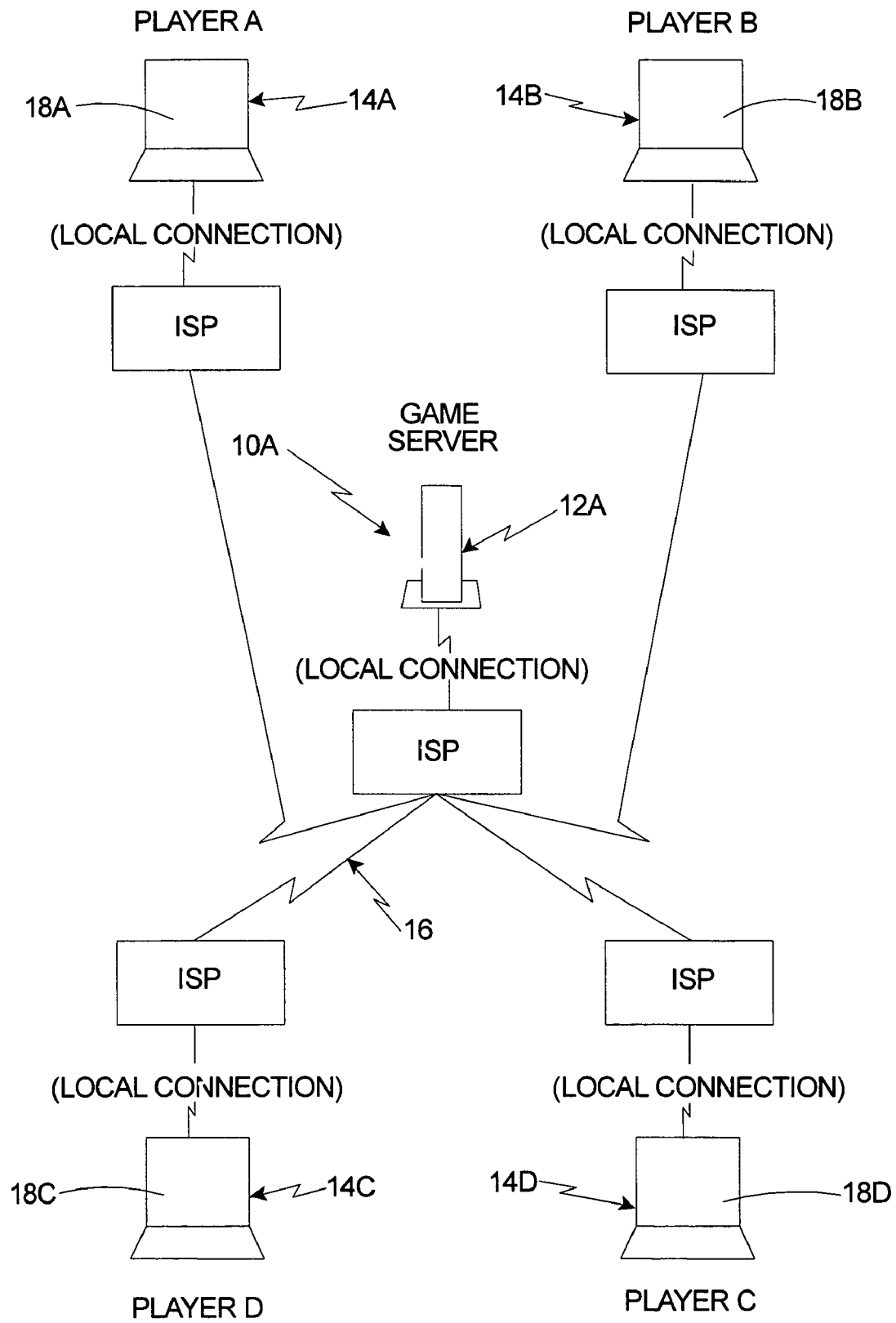
FIG. 1A is a block diagram of a first embodiment of a computer game system having features of the present invention that illustrates the interconnectivity among a plurality of clients and a game server using a communications network.

As an overview, FIG. 1A illustrates an on-line computer game system 10A that includes a game server 12A for use with a plurality of clients 14A-D which are all operatively connected together using a communications network 16, such as the Internet. The game server 12A includes computer hardware and software having one or more processors. The software can include animation software, e.g., Macromedia Flash, Shockwave, etc., which develops interactive graphics for the website, and which includes one or more interactive games. The game server 12A manages and controls functions related to communications among and/or between the clients 14A-D, as well as data and other information or communication transfers between the game server 12A and one or more of the clients 14A-D.

Each of the clients 14A-D includes necessary hardware and software for initiating, controlling and displaying images that are generated during use of the game system 10A. Each client 14A-D typically includes a computer 18A-D having processing and application program execution capability, such as a personal computer (PC), together with appropriate peripheral devices including a terminal or display screen and an input device, such as a mouse or keyboard, as examples. Generally, one player uses one of the clients 14A-D to communicate with the client 14A-D of another player.

With reference to FIG. 1A, the game server 12A can regulate the overall control associated with playing any of the games described herein. Generally, the games can include the interaction of one or more virtual game pieces (illustrated in FIG. 2) that are remotely controlled from each of a plurality of players. For ease of discussion, the virtual game pieces are sometimes simply referred to herein as "game pieces". The communications network 16 can include a number of communication sub-systems or apparatuses. Each client 14A-D is able to electronically communicate with the communications network 16 using an Internet service provider (ISP) or an on-line service provider, such as America Online (AOL), AT&T or Earthlink as non-exclusive examples. Access to such service providers is achieved through a local telephone, cable or other communications connection from each client 14A-D.

The mouse or other input device of each client 14A-D enables the player to initiate and/or carry out the player's own movements, decisions and/or actions. A computer display screen depicts the various aspects of one or more of the games provided herein, including the animation and special effects of the game pieces, as well as various modes of communication that are initiated and utilized by the players. The games and the communications associated with the games will be described in greater detail below.

The game server 12A, like the clients 14A-D, can also communicate with the Internet through a local connection and a service provider to the Internet. The game server 12A can store all user and game data in a database such as a Structured Query Language (SQL) database. Further, the game server 12A can access the communications network 16 to transfer or transmit information and/or data to the players. Each of the clients 14A-D can have an address associated with it that the game server 12A uses in connection with communication transfers. Additionally, the game server 12A has an address that enables desired communications from the clients 14A-D to reach the game server 12A in the context of initiating and playing the games.

The game server 12A can be a multi-processing unit capable to handling a substantial number of clients 14A-D in the context of one or more games being simultaneously played and/or other features of the game server 12A being accessed. In one embodiment, each client 14A-D can have identical or substantially similar software which can be obtained by downloading the software from the game server 12A, if required. In an alternative embodiment, no downloading of software is required by the clients 14A-D.

Figure 1B:
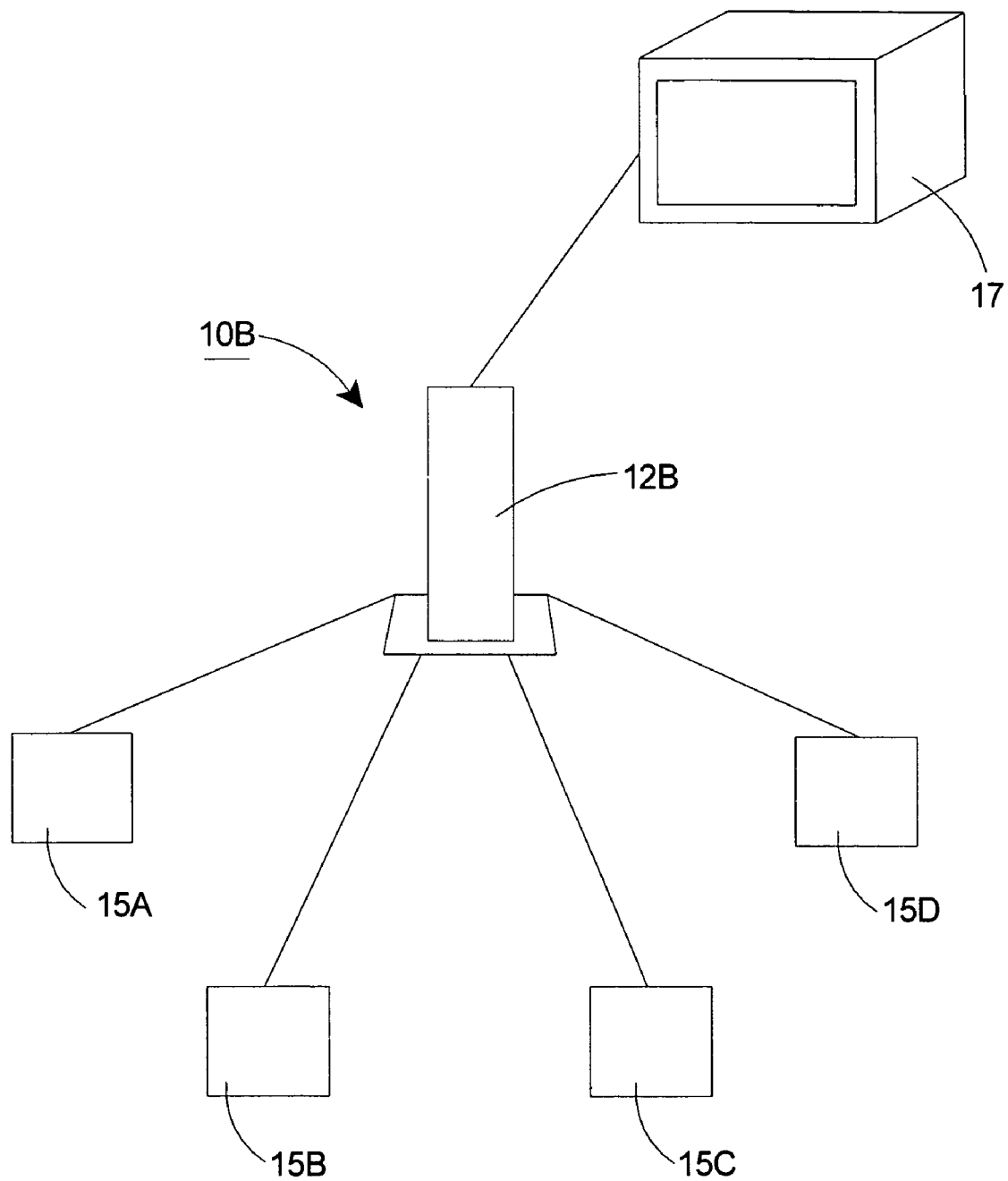
FIG. 1B is a block diagram of a second embodiment of the computer game system having features of the present invention that illustrates the interconnectivity among a plurality of clients and a game server.

FIG. 1B illustrates an alternative embodiment of the computer game system 10B for one or more players that includes a game server 12B for use with a plurality of clients A-D. In this embodiment, the game server 12B and the clients A-D are operatively connected together using a somewhat isolated, wired or wireless standalone-type of connection that does not rely on a communications network such as the Internet. In this embodiment, the game server 12B can perform many of the functions previously described, but can be connected in a wired or wireless manner to a display monitor 17, which can be a computer screen, a television screen, etc., for viewing by the players.

Figure 2A:
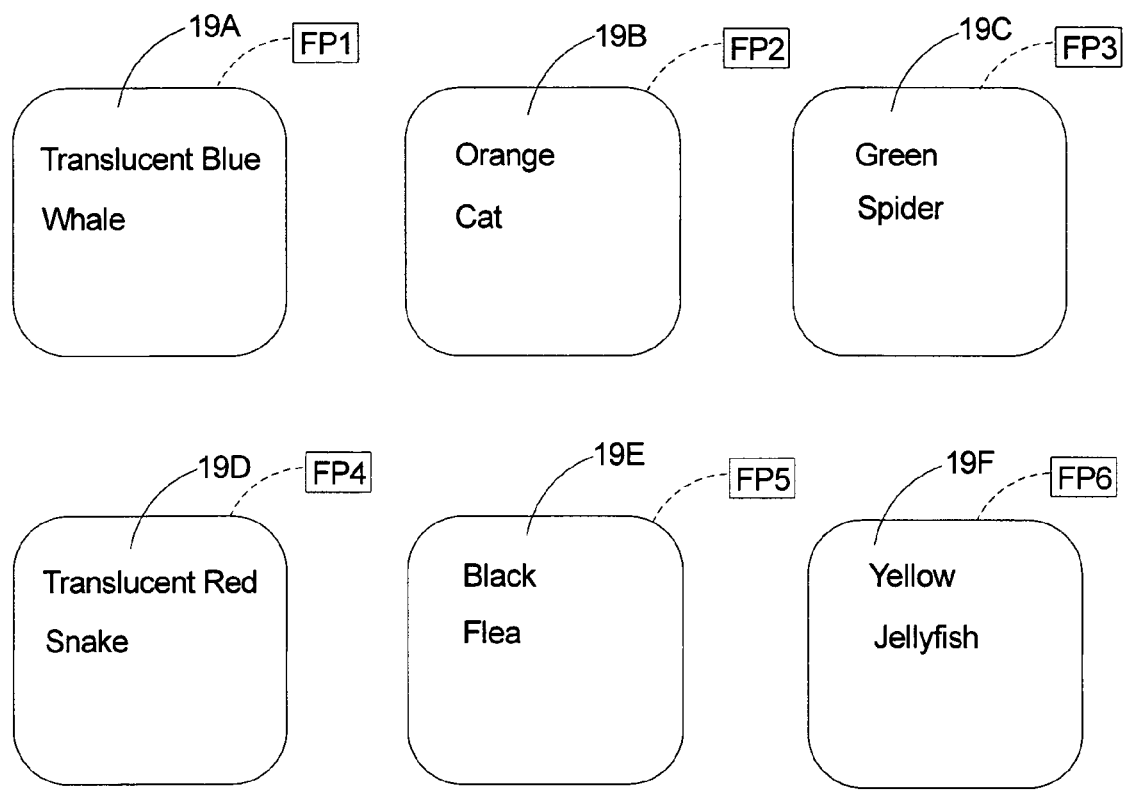
FIG. 2A is a simplified representation of six virtual game pieces, each having a fixed battle parameter.

FIG. 2A is a simplified representation of an embodiment of six virtual game pieces that can be used with the present invention. As an overview, the game pieces of different players can engage in virtual battles (also referred to herein simply as a "battle") with each other to determine a winning game piece and a losing game piece.

For ease of discussion, the game pieces in FIG. 2A include a first game piece 19A, a second game piece 19B, a third game piece 19C, a fourth game piece 19D, a fifth game piece 19E and a sixth game piece 19F. The actual computer graphics and computer representation of the game pieces 19A-F can vary widely. For example, each game piece 19A-F can include various artistic features, including differing colors, images, special effects, animations, shapes, configurations, sounds, etc. Additionally, some of the game pieces 19A-F may be more prevalent or rare than other game pieces 19A-F, making them easier or more difficult to obtain. Moreover, each game piece 19A-F can exhibit varying movements via animation which can make the game pieces 19A-F appear somewhat lifelike. For instance, using software known generally to those skilled in the art, graphics can be utilized which provide the game pieces 19A-F with a three-dimensional appearance and/or can allow game pieces 19A-F to change their shape, or "morph" into other figures and/or images. Alternatively, each game piece 19A-F can be a computer-generated image of an actual person or a fictitious character. Still alternatively, the game pieces 19A-F can include an image of an inanimate object, an animal, or can have any other suitable visual designs.

Each game piece 19A-F can have one or more respective fixed battle parameters FP1-6 that are innate to the particular game piece 19A-F. For example, the fixed battle parameters FP1-6 illustrated in FIG. 2A can be programmed for each game piece 19A-F into the software or firmware by a game programmer (not shown). In one embodiment, one of the fixed battle parameters FP1-6 can be referred to as a "strength" parameter. However, additional fixed battle parameters, or no fixed battle parameters, may be used with the game pieces 19A-F in the present invention.

The strength parameter is inherent to the game piece 19A-F so that one or more of a particular color, graphic design, character, animal and/or other defining characteristic of the game piece 19A-F is associated with the strength parameter of that game piece 19A-F. Stated another way, a predetermined strength parameter can be associated with a single characteristic or a combination of characteristics of the specific game piece 19A-F. As set forth herein, the strength parameter of the game piece 19A-F can have a numeric value that is used in an algorithm that determines the intrinsic probability that the game piece 19A-F will win a battle, all other factors considered equal.

For instance, the color alone of the first game piece 19A (translucent blue) may be associated with a strength parameter of "3" or "4" on a scale of 1 to 5. However, the image on the first game piece 19A (a whale) may be associated with a strength parameter of "4". In another example, the caricature of the second game piece 19B (a cat) can have a strength parameter of "1", "2" or "3", but the orange color of the second game piece 19B may definitively be associated with a strength parameter of "2". In yet another example, a particular color may be associated with a specific strength parameter without regard for the caricature on the game piece 19A-F.

The range of the strength parameter can vary. It is recognized that the foregoing range having a "scale of 1 to 5" is provided as a representative example only, and is not intended to limit the scope of the present invention in any manner. For example, the scale can be greater or less than 1 to 5. Alternatively, the scale can be other than numeric, as long as a suitable range for the strength parameter is provided to differentiate the various types of game pieces 19A-F.

The probability of winning a battle based solely on the strength parameter can change even though the strength parameter does not change, depending upon the opposing game piece in a particular battle. For instance, if the strength parameter of the first game piece 19A yields an intrinsic probability that the first game piece 19A will win a battle approximately 60% of the time, and the strength parameter of the second game piece 19B which battles the first game piece 19A also yields an intrinsic probability that the second game piece 19B will win a battle approximately 60% of the time, the net probability of either game piece 19A, 19B winning a battle between the first and second game pieces 19A, 19B, would be approximately 50% since each game piece 19A, 19B is of substantially equal strength relative to the other.

In accordance with one embodiment, the players cannot change the strength parameter. Further, in one embodiment, the players are not provided with an actual value for the strength parameter. Rather, the players may only be able deduce an approximate relative value of the strength parameter for a particular game piece 19A-F, if at all, based on the player's experience with the game piece 19A-F including won/loss percentages and/or other statistical data provided to the player regarding the game piece 19A-F, as provided herein. Additionally, players can commiserate in one or more chat rooms to discuss the relative success or failure of various game pieces 19A-F in order to deduce the approximately relative value of the strength parameter(s) for those game pieces 19A-F. In an alternative embodiment, the players may be provided numerical values or other indications of the strength parameter of one or more game pieces 19A-F in that player's game piece portfolio.

Figure 2B:
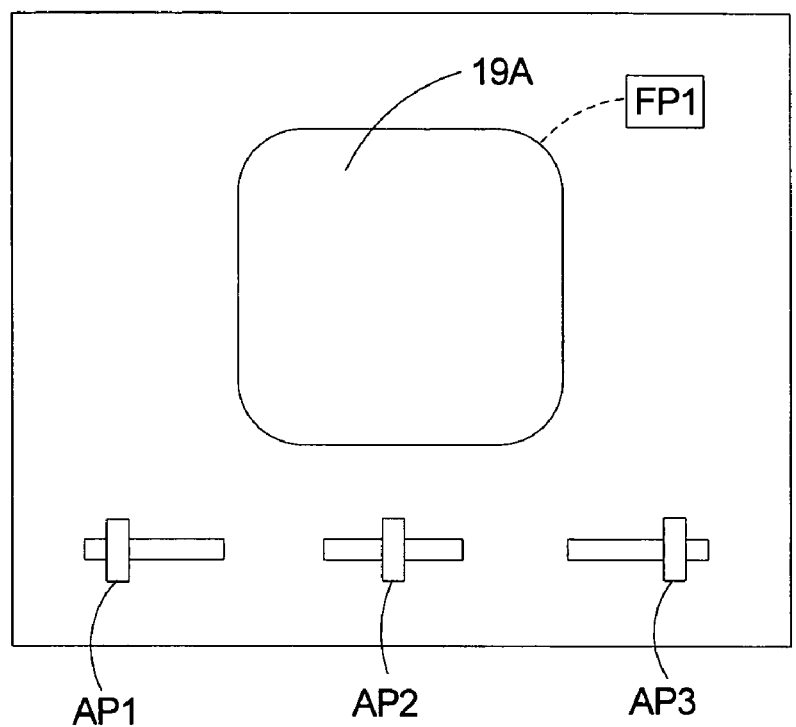
FIG. 2B is an exemplar of a screen shot of one embodiment of a plurality of virtual game pieces, each having a plurality of adjustable battle parameters.

Referring to FIG. 2B, in some embodiments, one or more adjustable battle parameters AP1-3 exist that can combine with the fixed battle parameter(s) FP1, FP6 to influence the probability of a particular game piece 19A, 19F winning a battle. In contrast to the strength parameter, in one embodiment, one or more of these adjustable battle parameters AP1-3 for a game piece 19A, 19F can be adjusted by the player prior to engaging in a battle with another game piece 19A, 19F.

For example, in one embodiment, the adjustable battle parameters AP1-3 can include a power parameter, a speed parameter and an endurance parameter. As used herein, these adjustable battle parameters can also be referred to as a first adjustable battle parameter AP1, a second adjustable battle parameter AP2 and a third adjustable battle parameter AP3. Importantly, any adjustable battle parameter AP1-3 can be the first, second or third battle parameter. In addition, it is recognized that the number of adjustable battle parameters AP1-3 can be greater than or fewer than three, and the names for each of the adjustable battle parameters AP1-3 can vary from those set forth above.

Prior to engaging in a battle with an opposing game piece, the player can adjust one or more of the adjustable battle parameters AP1-3. In one embodiment, the adjustment can be a sliding control that is adjusted by the player, as illustrated in FIG. 2B. Alternatively, the player can adjust the adjustable battle parameters AP1-3 by selecting a numeric value, or by any other suitable means. The adjustable battle parameter(s) AP1-3 are used in the algorithm along with the fixed battle parameter(s) FP1, FP6 in order to determine the net probability that a particular game piece 19A, 19F will defeat another game piece 19A, 19F in a battle. Once the probability has been determined, the outcome of the battle will be consistent with and will depend upon this probability.

In one embodiment, each game piece 19A, 19F can have a single optimal setting or combination of settings of the adjustable battle parameters AP1-3 that maximize that game piece's 19A-F probability of winning a battle. FIG. 2B illustrates an example of possible settings for the adjustable battle parameters AP1-3 for the first game piece 19A and the sixth game piece 19F. In an alternative embodiment, the optimal setting or combination of settings of the adjustable battle parameter(s) AP1-3 for each game piece 19A, 19F can vary depending upon the characteristics of the opposing game piece 19A, 19F in a battle. These characteristics can vary, and can include the fixed battle parameter(s) FP1, FP6 and/or the adjustable battle parameter(s) AP1-3, as non-exclusive examples.

Further, in one embodiment, the player can try to deduce what the optimal settings for the adjustable battle parameters AP1-3 for a particular game piece 19A, 19F should be. This can be accomplished by trial and error, statistical analysis, commiserating in a chat room with other players, or by some other method determined by the player. Stated another way, the player is not directly provided any information or data regarding what the optimal settings for the adjustable battle parameters AP1-3 are for any particular game piece 19A, 19F. With this design, players are encouraged to share information based on their experiences during the battles in order to determine which settings produce a higher probability of winning a battle, and which settings produce a lower probability of winning a battle involving a specific game piece 19A, 19F. Alternatively, the player is directly provided with some or all information or other data which may be indicative of settings for one or more of the adjustable battle parameters AP1-3 that may yield a higher or lower probability of winning a battle.

Figure 2B:
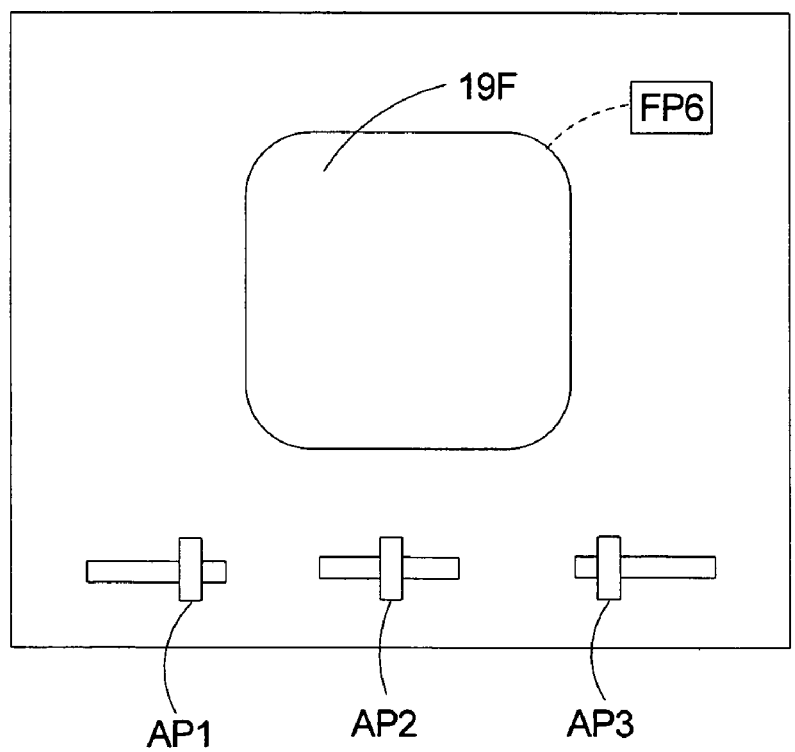
Figure 3:
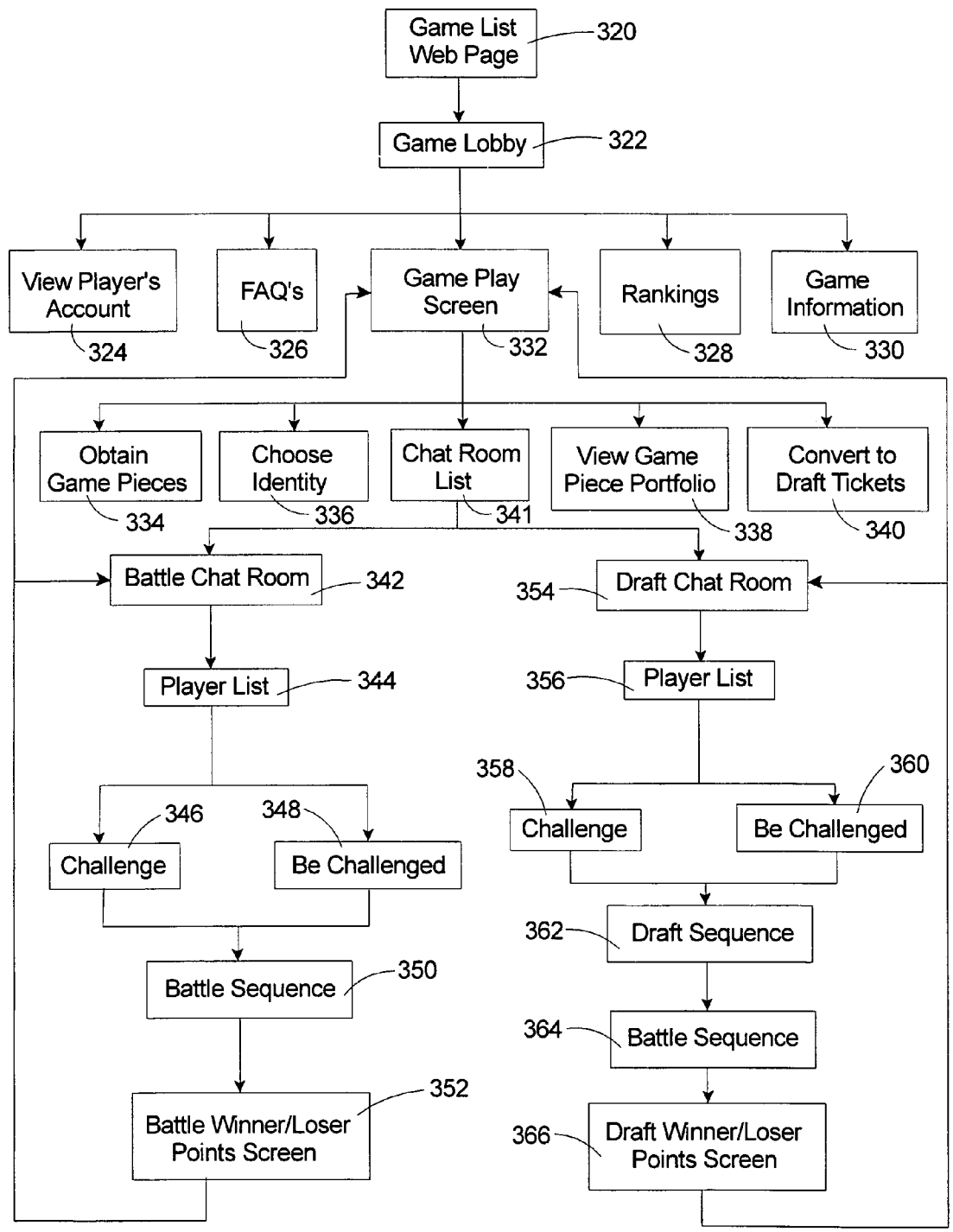
FIG. 3 is a flow chart of the features of one embodiment of the computer game system, including a battle game and a draft game.

FIG. 3 is a flow chart that generally outlines various functions and features of the game system. The player first negotiates his/her way to the appropriate website 320 which includes accessing the game server 12A (illustrated in FIG. 1A). Internet-based protocol TCP/IP (transmission control protocol/Internet protocol) can automatically provide the player with access to the website 320 and/or the game server 12A. Once the player accesses the game server 12, the player can congregate with other players in a game lobby 322, as depicted in FIG. 2. The player can access the game lobby 322 by inputting appropriate access information, such as using the mouse to click on icons or using a keyboard to type in key words, passwords and/or alphanumeric identifiers, for example. Once in the game lobby 322, the player can choose one or more options, including viewing that player's account at step 324, accessing frequently asked questions and other game information at step 326, viewing rankings of various players and/or game pieces at step 328, and/or viewing information on the types of game pieces available at step 330. Further, the player can navigate to a game play screen at step 332.

In one embodiment, the object of the games described herein can be to compile points by successfully defeating another player's game piece during a battle. Alternatively, the object can include winning prizes, winning the game pieces from another player, or any other suitable reward.

As provided above, the game lobby 322 can allow a player to access and view his or her own account at step 324. For example, the account can include viewing the player's game piece portfolio. In one embodiment, all of the player's virtual game pieces, including active game pieces and/or deactivated game pieces, can be available for browsing in the game piece portfolio. Further, any or all information involving each player's game pieces can be accessed. The portfolio can allow the players to search for a game piece and/or filter the game piece list by color, status (activated, deactivated), rarity, date activated/deactivated, success of each game piece including number of battles won or lost, images of game pieces that were victorious over or defeated by a game piece in the player's portfolio, etc. Further, in one embodiment, additional statistical analyses of victories and losses can be viewed by the player for each of the game pieces in the portfolio.

The game lobby 322 can also provide the players to access a list of frequently asked questions including more specific information regarding the particular games that can be played at step 326. Additionally, the game lobby 322 can allow the players to access rankings of other players, rankings of the game pieces relative to won/loss percentages or consecutive wins by one or more game pieces, and the like, at step 328. The game lobby 322 may also provide general game information regarding the various game pieces, including characteristics such as names, colors, rarity, etc., at step 330.

At the game play screen 332, various functions are available to the player. For example, in one embodiment, the player can obtain additional game pieces 334, choose an identity 336, view that player's game piece inventory 338, convert game pieces to one or more draft tickets 340 and/or view a chat room list 341.

To obtain additional game pieces at step 334, the player may need to input a particular access code. In one embodiment, the player is provided the access code upon winning a battle or a series of battles during one of the games.

The player has the option of choosing an identity for that player's use during playing of any of the games at step 336. The identity can be in the form of an icon or symbol, or it can be some other form of indicia for that player.

The player's game piece inventory, which can include both activated game pieces and/or inactivated (dead) game pieces can be viewed from the game play screen 332, at step 338. In one embodiment, the player may also view the battle history for each of the game pieces in the inventory, including number of wins, which opposing game pieces were defeated by the game piece, and other factual and/or statistical information regarding the game pieces in the player's activated or deactivated inventory.

In one embodiment, the player can convert a predetermined number, i.e. two, five, ten, etc., game pieces into a draft ticket at step 340. As used herein, the draft ticket is used for playing the draft game (described in detail below), and can include any predetermined number of game pieces. In one embodiment, the game pieces selected by the player that are converted into a draft ticket are not actually used during the draft game. In other words, the player need only obtain a draft ticket to play the draft game, and the game pieces used to obtain a draft ticket are of no consequence. In an alternative embodiment, the player can select specific game pieces to be included in a particular draft ticket. Still alternatively, the game pieces can be randomly selected by the software of the server 12A (illustrated in FIG. 1A).

A list of on-line chat rooms, which can include one or more battle game chat rooms and/or one or more draft game chat rooms, can be viewed by the player at step 341. Chat rooms for other games can also be accessed from the game play screen 332. The list can include additional information such as the name and/or number of players currently in each chat room, the maximum occupancy of each chat room, etc. The player can then enter one of the chat rooms, which in one embodiment allows the player to communicate with other players in the chat room using known messaging capabilities, and/or the player can play one of the games of the game system 10. The design and/or rules for each chat room can vary.

Once the player enters one of the battle game chat rooms at step 342, the player can view a list of players within the battle game chat room at step 344. At this point, the player can either challenge one of the players in the chat room to a battle game at step 346, or the player can be challenged to play the battle game by one of the other players in the chat room at step 348. Once two or more players have agreed to play the battle game against each other, a battle can then commence, as described below.

Alternatively, the player can enter one of the draft game chat rooms at step 354. From this chat room, the player can view a list of players within the draft game chat room at step 356. At this point, the player can either challenge one of the players in the chat room to a draft game at step 358, or the player can be challenged to play the draft game by one of the other players in the chat room at step 360. Once two or more players have agreed to play the draft game against each other, the draft game can then commence, as provided below.

Alternatively, the player can enter a chat room not specifically associated with any one game. From this chat room, the player can view a list of players. At this point, the player can either challenge one of the players in the chat room to any type of game, or the player can be challenged to play any type of game by one of the other players in the chat room. Once two or more players have agreed to play a specific type of game, the specified game can then commence as provided below.

In one embodiment, there can always be at least one available chat room per game type for players to enter where they can find opponents to challenge. When the number of people in a chat room exceeds a predetermined threshold (e.g., 50 players) then a new chat room for the game can automatically be created. Moreover, in another embodiment, when a chat room reaches its maximum capacity (e.g., 50 players) then players may not be able to enter the room. If they attempt to enter the closed room then they can see a message such as "Access denied . . . Chat Room Full", or another appropriate message.

Playing the Battle Game

Referring to FIG. 3, the battle game includes a battle sequence 350 that occurs between opposing game pieces. The battle sequence 350 can involve a single battle between two game pieces, or a series of battles using more than two game pieces. As an overview, in some embodiments, the object of the battle sequence 350 is to increase the probability that one's game piece will win the battle, and ultimately, to win the battle.

To begin the battle game, the player must first find an opponent. Within the battle chat room 342, players can type in customized messages that are displayed to all users in the chat room 342. In addition, a player can select a single player from the list and send a "challenge" message to the potential opponent. If the opponent accepts the challenge then a battle can begin. Alternatively, two players can decide outside of the chat room 342 to play the battle game (or another game provided herein).

In some embodiments, players in the battle chat rooms 342 who have accepted a challenge or are in a battle can be displayed as "unavailable" and may not have challenge messages sent to them at that time. In addition, a player can choose to challenge any available opponent to a battle (available opponents can be any or all players in the chat room 342 who are not currently engaging in the battle game or other game).

Once a challenge has been accepted, each player can have a predetermined amount of time to select one of that respective player's game pieces to participate in the battle, and/or to adjust one or more of the adjustable battle parameters including one or more of the following: the power parameter, the speed parameter and the endurance parameter. Once time has run out, or when both players have accepted their chosen adjustable battle parameters, the battle sequence 350 can begin.

The battle can include an animation displayed to both players simultaneously showing both game pieces interacting, engaging or battling. The end of the animation can show the outcome of the battle to each player (a "winner" or "loser" animation, for example).

In one embodiment of the battle game, the winner of the battle sequence 350 is awarded battle points which are applied to determine the player's ranking among other players. Further, in one such embodiment, the battle points can be redeemed for prizes that can be ordered from the website 320. In one embodiment, the winner of a battle wins a number of battle points that is determined by the rarity, number of victories, or other relevant criteria regarding the opponent's game piece that was beaten in the battle.

In another embodiment of the battle game, the winner of the battle sequence 350 wins the opponent's losing game piece. In this embodiment, the winning player can have the winning game piece placed into their game piece portfolio, for example. The game piece portfolio can also be automatically updated based on the outcome of each battle. Further, in this embodiment, the losing player will have the losing game piece marked in their portfolio as "dead", and the losing player will no longer be able to use this game piece.

FIG. 4 is a representative example of at least a portion of a lookup table for determining the number of battle points to be awarded to a player following a winning battle. The battle points reward system can be varied. For example, the number of battle points can increase with each successive win by a particular game piece. The increase can be linear, exponential, logarithmic, random, or by some other suitable scale. It is recognized that the table in FIG. 4 can vary substantially, and that any number of possible point systems can be created for rewarding the player of a winning game piece.

Playing the Draft Game

Referring back to FIG. 3, the draft game can be an on-line Macromedia Flash or Shockwave game where two or more players use a random or select pool of game pieces to battle in one or more rounds or series of rounds. The last player with one or more undefeated game pieces is the winner. In one embodiment, the winner gets to keep any undefeated game pieces and may win additional game pieces, draft battle points and/or other prizes as set forth herein.

In one embodiment of the draft game, in order to participate, each player needs to have at least one draft ticket (not shown). In this embodiment, each draft ticket can give a player an entry into the draft game. Further, draft tickets can be accumulated by trading a predetermined number (e.g. five) of active game pieces from the player's game piece portfolio in exchange for one or more draft tickets.

In one embodiment, to begin the draft game, the player will need to challenge an opponent in one of the draft chat rooms 354. Within a draft chat room 354, players can see a list of all current players in the room at step 356. Every player is able to type in any message that can be displayed to one or more players in the draft chat room 354. In addition, the player can select one specific player from the list and send a "challenge" message to the potential opponent at step 358. If the opponent accepts the challenge then the draft game can commence. Players in the draft chat rooms 354 who have accepted a challenge or are in a game can be displayed as "unavailable" and may not have challenge messages sent to them at that time.

Each player can have a draft ranking, which can be based on past success or failure during draft games, or the ranking can be based on other relevant criteria. In one embodiment, from within the draft game, the player can see his/her current ranking. In addition, the player can also see the number of current draft tickets held by that player, and the specific game pieces included in those draft tickets, if applicable.

Any number of players can participate in the draft game. In one embodiment, each player must have one draft ticket which consists of a given number of game pieces, i.e. two, five, ten, etc. In alternative embodiments, each player must have more than one draft ticket.

In one embodiment of a draft game, the game is broken down into a draft sequence 362, followed by a draft battle sequence 364. The draft sequence 362 of the draft game can vary. In the two-player game, for example, the draft ticket of each player exchanged for a random pool of game pieces that are not associated with the game pieces used by each player to obtain their respective draft tickets. Assuming for this example that pool of game pieces includes ten game pieces, the draft game would proceed using a number of rounds. In Round 1 of this embodiment, a first player chooses any one of the game pieces. The second player then chooses a game piece from the draft pool. The players continue, alternately taking turns in this manner until all of the game pieces in the draft pool have been selected, and the draft battle sequence 364 can then begin.

The players each select a game piece from their respective selected game pieces for use in a first battle. Alternatively, the game system 10 can automatically select the game pieces to be used in each battle for the players. The first battle using these two game pieces can be substantially similar to the type of battles previously described with respect to the battle sequence 350 of the battle game. Once a winner is determined, the winner keeps his or her game piece and a second battle can commence. The game piece of the losing player can go onto a "dead game piece" list of the losing player.

In one embodiment, the battles in Round 1 continue until each of the game pieces has engaged in exactly one battle. Once this has concluded, Round 1 of the draft game battles is over. At the end of Round 1, if one player has no game pieces left, that player is eliminated, and the other player wins the draft game. In one embodiment, the winner may keep all undefeated, active game pieces and can use them in future battles. Alternatively, the winner does not keep any of the game pieces.

There can be a brief animation period after the round that shows the score, including one or more of: each player's win-loss record for the draft, by round, and total, and how many game pieces remain on each side. The players can then navigate or be automatically taken back to the draft chat room 354 or the game play screen 332. At this point, the winning player can be entitled to receive draft points, another draft ticket, additional game pieces or other suitable prizes.

In the event both players still have one or more undefeated game pieces after Round 1, the players can proceed to Round 2. In one embodiment of Round 2, the player with fewer undefeated game pieces remaining can be referred to as the challenger. In the event both players have the same number of game pieces remaining, whichever player most recently lost a battle can be considered the challenger for the round. Alternatively, whichever player most recently won a battle can be considered the challenger for the round, or the challenger can be determined in another suitable manner.

Round 2 proceeds substantially similarly to Round 1. The battles continue each of the challenger's game pieces (in this example, the player having the fewest remaining undefeated game pieces) have been involved in exactly one battle during Round 2. At the end of Round 2, if one player has no game pieces left, that player is eliminated, and the other player wins the draft game. In this event, the players can navigate or be taken to the appropriate screens as described above. If both players still have one or more undefeated remaining game pieces from the original draft pool, the players proceed to Round 3. Each successive round can be played somewhat similarly to the previous round until one player has no more undefeated game pieces remaining. At that point, the other player is declared the winner.

Play during the draft game can be expanded by adding more draft tickets to the initial draft or by having more players. To add additional draft tickets, each of the two players "opens" the same number of draft tickets, and the initial draft pool is larger. Alternatively, the players can mutually agree to expand the draft pool after the draft game has commenced.

The number of rounds of the draft game can depend at least in part upon the number of initial game pieces that comprise the draft pool.

As provided above, the draft game can be played with any number of players. For example, in a draft game involving more than two players, e.g. eight players, the players can sign up in a "queue". Once eight players have signed up and are in the queue, the draft game can commence.

Figure 5:
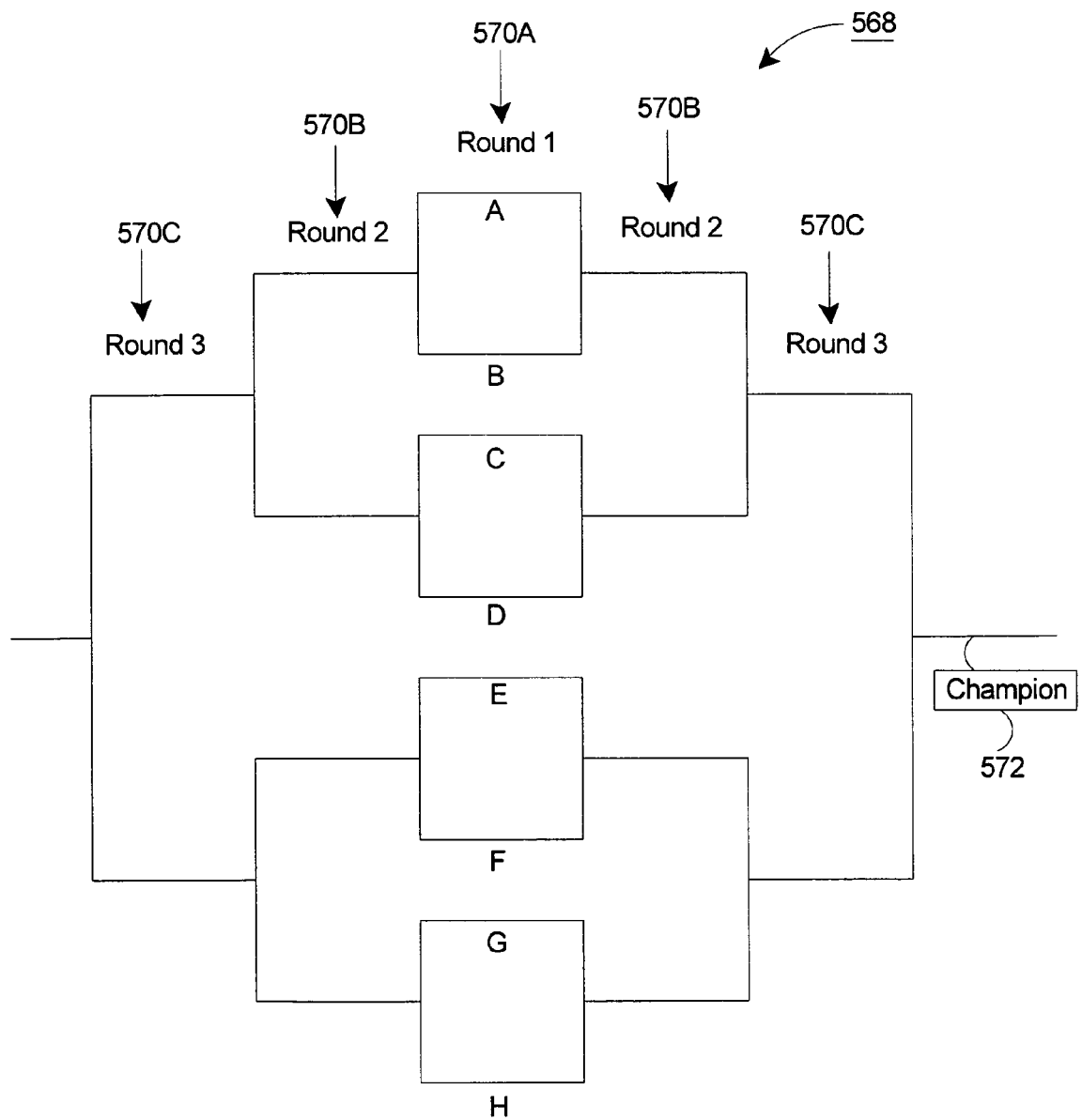
FIG. 5 is a diagram illustrating an embodiment of a tournament bracket used in the draft game.

FIG. 5 illustrates one possible embodiment of a virtual bracket 568 for the eight-player draft game. In one embodiment of the eight player draft game, the players can be labeled A-B-C-D-E-F-G-H. A virtual bracket is formed with the players being paired up. In this embodiment, A plays B, C plays D, etc. Play proceeds through three stages 570A-C, as provided below. Alternatively, the bracket 568 can be set up in numerous suitably different ways. For example, the bracket 568 can be set up as a single elimination bracket, a double elimination bracket, or another type of bracket. Each bracket 568 can include any number of stages 570A-570n. Further, the players can be "seeded" according to strength of the game pieces, by player ranking, or by another suitable method. In Stage 1 (570A), each pair then plays the draft game as described above in the two-player draft game.

In Stage 2 (570B) of this embodiment, the winner of A-B plays the winner of C-D. The loser of A-B plays the loser of C-D. The winner of E-F plays the winner of G-H. The loser of E-F plays the loser of G-H. Further, in one embodiment of Stage 2 (570B), the players can add any game pieces won from Stage 1 (570A) to their own winning game pieces from Stage 1 (570A). In addition, each player opens a draft ticket. Play continues through Stage 2 (570B) as provided above until all battles are completed.

Each player opens a new draft ticket prior to Stage 3 (570C). In Stage 3 (570C), the A-B-C-D bracket winner plays the E-F-G-H bracket winner, with the winner of this match becoming the champion 572 (also referred to herein as a "final winning player") of the draft game. Further, the losing players can continue to play in accordance with the bracket illustrated in FIG. 5. As before, game pieces that survived the previous stage are added to each successive stage of play. Play continues through Stage 3 (570C) as provided above until all battles are completed.

Once all battles have occurred and the draft game is completed, prizes can be awarded based on the round win/loss record of each player, the battle win/loss record of each player, or by some other suitable determination. Prizes can include any appropriate award, such as draft battle points, draft tickets, game pieces, or other actual prizes that can be forwarded to the players. Further, the players can also see their current ranking. In addition, the players can see the number of draft tickets they currently have.

While the particular computer game system 10A, 10B as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An interactive computer game system for one or more players including a first player, the computer game system comprising:
    a game server that generates (i) a first game piece that is remotely controlled by the first player, the first game piece having a first adjustable battle parameter that is directly adjustable by the first player and a first fixed battle parameter that is not directly or indirectly adjustable by the first player, the first adjustable battle parameter including an optimal setting, and (ii) a second game piece having a second adjustable battle parameter and a second fixed battle parameter, the game pieces engaging in a battle having an outcome determined by an algorithm that is based at least partly upon the first adjustable battle parameter and at least one of the fixed battle parameters, the optimal setting for the first adjustable battle parameter depending at least in part upon at least one of the second adjustable battle parameter and the second fixed battle parameter.

2. The computer game system of claim 1 wherein the second game piece is controlled solely by the game server.

3. The computer game system of claim 1 wherein the second game piece is remotely controlled by a second player.

4. The computer game system of claim 1 wherein each of the game pieces has a plurality of adjustable battle parameters, and wherein the algorithm is based at least partly upon each of the adjustable battle parameters for each of the game pieces.

5. The computer game system of claim 1 wherein the first fixed battle parameter is innate to the first game piece and the second fixed battle parameter is innate to the second game piece.

6. The computer game system of claim 3 wherein the second adjustable battle parameter is directly adjustable by the second player.

7. The computer game system of claim 6 wherein the algorithm is based at least partly upon the second adjustable battle parameter.

8. The computer game system of claim 6 wherein the outcome of the battle establishes a winning game piece and a losing game piece, the player controlling the winning game piece receiving a reward that is based on a value of the losing game piece.

9. The computer game system of claim 6 wherein prior to the game pieces engaging in the battle, one of the game pieces has a greater probability of losing the battle than the other game piece.

10. The computer game system of claim 6 wherein the game server generates a pool of game pieces, and wherein the first player selects a set of activated first game pieces from the pool of game pieces, and the second player selects a set of activated second game pieces from the pool of game pieces.

11. The computer game system of claim 7 wherein the algorithm is based at least partly upon the first fixed battle parameter and the second fixed battle parameter.

12. The computer game system of claim 8 wherein the value of the losing game piece is based at least in part on the fixed battle parameter of the losing game piece.

13. The computer game system of claim 8 wherein the value of the losing game piece is based at least in part on a number of battles previously won by the losing game piece.

14. The computer game system of claim 8 wherein the reward includes receiving a number of battle points that are used to determine a ranking of the player controlling the winning game piece.

15. The computer game system of claim 10 wherein the first player and the second player alternate during selection of the game pieces from the pool of game pieces.

16. The computer game system of claim 10 wherein during a first round, the game server allows each of the first game pieces to separately engage in only one battle with only one of the second game pieces, and allows each of the second game pieces to separately engage in only one battle with only one of the first game pieces.

17. The computer game system of claim 16 wherein the outcome of each battle during the first round results in one losing game piece that is inactivated, and one winning game piece that remains activated.

18. The computer game system of claim 17 wherein during each successive round that occurs after the first round, the game server allows each of the game pieces in the set having the fewest number of activated game pieces to separately engage in only one battle with only one of the game pieces in the remaining set so that no game piece in the remaining set engages in greater than one battle during each successive round.

19. The computer game system of claim 18 wherein the game server determines a winning player when only one of the players controls one or more activated game pieces.

20. A method for playing a computer game, the method comprising the steps of:
connecting a first computer to a game server;
generating a first game piece with the game server, the first game piece having a first adjustable battle parameter that is directly adjusted by a first player and a first fixed battle parameter that is not directly or indirectly adjusted by the first player, and
generating a second game piece with the game server, the second game piece having a second adjustable battle parameter and a second fixed battle parameter; and
determining the outcome of a battle between the first game piece and the second game piece by applying an algorithm that is based at least partly upon the first adjustable battle parameter and at least one of the fixed battle parameters, an optimal setting for the first adjustable battle parameter depending at least in part upon at least one of the second adjustable battle parameter and the second fixed battle parameter.

21. The method of claim 20 wherein the step of generating a second game piece includes the second adjustable battle parameter being directly adjustable by a second player.

22. The method of claim 21 wherein the step of determining the outcome includes basing the algorithm at least partly upon the second adjustable battle parameter.

23. The method of claim 22 wherein the step of determining the outcome includes basing the algorithm at least partly upon the first fixed battle parameter and the second fixed battle parameter.

24. The method of claim 20 wherein the step of determining the outcome includes one of the game pieces having a greater probability of losing the battle than the other game piece prior to the game pieces engaging in the battle.

25. The method of claim 20 further comprising the steps of the first player converting a predetermined number of game pieces into a first draft ticket, and a second player converting a predetermined number of game pieces into a second draft ticket.

26. The method of claim 25 further comprising the steps of generating a pool of game pieces with the game server, the first player exchanging the first draft ticket for a first set of activated game pieces from the pool of game pieces, and the second player exchanging the second draft ticket for a second set of activated game pieces from the pool of game pieces.

27. The method of claim 26 wherein the steps of the first player exchanging and the second player exchanging include the first player and the second player selecting an equal number of game pieces.

28. The method of claim 27 wherein the first player and the second player alternate during selection of the game pieces from the pool of game pieces.

29. The method of claim 27 further comprising the steps of during a first round, (i) the game server allowing each of the first game pieces to separately engage in only one battle with only one of the second game pieces, and (ii) the game server allowing each of the second game pieces to separately engage in only one battle with only one of the first game pieces.

30. The method of claim 29 wherein the outcome of each battle during the first round results in one losing game piece that is inactivated, and one winning game piece that remains activated.

31. The method of claim 30 further comprising the step of during each successive round that occurs after the first round, the game server allowing each of the game pieces in the set having the fewest number of activated game pieces to separately engage in only one battle with only one of the game pieces in the remaining set so that no game piece in the remaining set engages in greater than one battle during each successive round.

32. The method of claim 31 further comprising the step of the game server determining a winning player when only one of the players controls one or more activated game pieces.

33. The method of claim 20 further comprising the steps of the first player accessing a chat room, and the first player challenging a second player to a battle.

* * * * *